(12) United States Patent
Moody et al.

(10) Patent No.: US 8,938,506 B2
(45) Date of Patent: Jan. 20, 2015

(54) SYSTEM AND METHOD FOR ADDRESSING MESSAGES

(75) Inventors: Paul B. Moody, Hyde Park, VT (US);
Daniel M. Gruen, Newton, MA (US);
Steven L. Rohall, Winchester, MA (US);
Bernard J. Kerr, Boston, MA (US);
Seymour Kellerman, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1326 days.

(21) Appl. No.: 10/745,483

(22) Filed: Dec. 29, 2003

(65) Prior Publication Data

US 2005/0177621 A1    Aug. 11, 2005

(51) Int. Cl.
*G06F 15/16*    (2006.01)
*G06Q 10/10*    (2012.01)

(52) U.S. Cl.
CPC .................................. *G06Q 10/107* (2013.01)
USPC ........................................ 709/206; 709/204

(58) Field of Classification Search
CPC .............................. G06F 15/16; G06Q 10/107
USPC .................................. 709/206, 204; 715/752
See application file for complete search history.

(56) References Cited

U.S. PATENT DOCUMENTS

| | | | | |
|---|---|---|---|---|
| 6,424,841 | B1 * | 7/2002 | Gustafsson | 455/466 |
| 6,463,134 | B1 * | 10/2002 | Okada et al. | 379/93.24 |
| 6,496,853 | B1 * | 12/2002 | Klein | 709/206 |
| 6,697,852 | B1 * | 2/2004 | Ryu | 709/220 |
| 6,704,772 | B1 * | 3/2004 | Ahmed et al. | 709/207 |
| 6,708,205 | B2 * | 3/2004 | Sheldon et al. | 709/206 |
| 6,769,012 | B1 * | 7/2004 | Liu et al. | 709/204 |
| 7,035,903 | B1 * | 4/2006 | Baldonado | 709/206 |
| 7,130,885 | B2 * | 10/2006 | Chandra et al. | 709/206 |
| 7,359,936 | B2 | 4/2008 | Gruen et al. | |
| 7,363,590 | B2 | 4/2008 | Kerr et al. | |
| 7,392,280 | B2 | 6/2008 | Rohall et al. | |
| 7,849,147 | B2 | 12/2010 | Rohall et al. | |
| 7,865,560 | B2 | 1/2011 | Rohall et al. | |
| 2001/0018703 | A1 * | 8/2001 | Miyazawa et al. | 709/203 |
| 2002/0138582 | A1 * | 9/2002 | Chandra et al. | 709/206 |
| 2002/0167522 | A1 * | 11/2002 | Miyazawa | 345/530 |

(Continued)

OTHER PUBLICATIONS

Venolia, Gina Danielle, "Understanding Sequence and Reply Relationshops within Email Conversations: A Mixed-Model Visualization", Apr. 5, 2003, Association of Computing Machinery, Inc., vol. No. 5, Issue No. 1, pp. 361-368.*

(Continued)

*Primary Examiner* — Guang Li
(74) *Attorney, Agent, or Firm* — Cuenot, Forsythe & Kim, LLC

(57) ABSTRACT

A method is provided for automatically using address information from a selected message to create a new message that is unrelated to the selected message in response to a user action, such as selecting one of a plurality of improved reply options. These improved reply options may include a "New Message To" command and a "New Message To All" command that do not establish a relationship between the reply message and the selected message that could be exploited by, for example, a threading service. In particular, these commands populate address fields of the new message with values from address fields of the selected message without populating any other fields that are used to identify relationships among messages.

11 Claims, 3 Drawing Sheets

(56) References Cited

U.S. PATENT DOCUMENTS

| | | |
|---|---|---|
| 2003/0101065 A1 | 5/2003 | Rohall et al. |
| 2003/0158903 A1 | 8/2003 | Rohall et al. |
| 2003/0163537 A1 | 8/2003 | Rohall et al. |
| 2003/0167310 A1 | 9/2003 | Gruen et al. |
| 2003/0177190 A1 | 9/2003 | Moody et al. |
| 2005/0057584 A1 | 3/2005 | Kerr et al. |
| 2005/0066005 A1* | 3/2005 | Paul .............................. 709/206 |
| 2005/0091318 A1* | 4/2005 | Keohane et al. .............. 709/206 |
| 2008/0192302 A1 | 8/2008 | Rohall et al. |
| 2008/0244372 A1 | 10/2008 | Rohall et al. |

OTHER PUBLICATIONS

Boyce, Jim, "Microsoft Office Outlook 2003 Inside out", Nov. 5, 2003, Microsoft Press, Cd Version, Chapter 7.*

Boyce, Kim "Microsoft Office Outlook Inside and Out", Copyright @2001, Microsoft Press, Book Verison, Chapter 7.*

\* cited by examiner

SYSTEM AND METHOD FOR ADDRESSING MESSAGES

FIELD OF THE INVENTION

The invention includes an email command that generates a new message using addresses of one or more recipients included in an unrelated message.

BACKGROUND OF THE INVENTION

Conventional email systems typically include a reply command that uses addresses of recipients of a selected message to address a reply message. Messages and their replies typically form a set of related messages sometimes referred to as a thread. Often times, this set of related messages may be many levels or layers of replies, replies to replies, etc., in which a particular topic is discussed among the group of recipients.

Some users occasionally use the reply command as a short cut for addressing a new message to the sender and/or one or more of the recipients of the selected message even when the new message is unrelated to the selected message. This poses a problem with existing email systems that include or operate in connection with a threading system (or service) that tracks related messages and/or documents. These email systems make use of the relationships among messages in a thread by allowing a user to issue a command on one message or document in a particular thread, and have that command be applied to one or more other messages or documents in the thread.

When a user uses the reply command with respect to a selected message as short cut for addressing a new, unrelated message, a problem arises with the threading service. The reply command creates a relationship between the new message and the selected message that is otherwise exploited by the threading service. In the example above, even though the relationship created is an artificial one, created for purposes of convenience, the relationship may later cause unintended consequences.

What is needed is a mechanism that allows a user to address a new message to one or more recipients of a selected message with without creating a relationship between the new message and the selected message.

SUMMARY OF THE INVENTION

According to the invention, a user interface provides a command that uses addresses of one or more recipients of a selected message to address a new message without creating a relationship between the new message and the selected message.

In some embodiments of the invention, a reply module operating in conjunction with a user interface associated with an email system allows a user to reply to a selected message in a variety of ways including one or more of a "Reply to Sender Only" command, "Reply to All Recipients" command, "Reply to All in Thread" command, a "New Message To" command, or a "New Message To All" command.

The user may select from among these commands corresponding to a desired result of the user. For example, in some embodiments of the invention, if the user wishes to send a reply related to the selected message (i.e., a "related reply") only to the sender of the selected message, the user may select the reply command "Reply to Sender Only." In some embodiments of the invention, if the user wishes to send a related reply to all recipients of the selected message, the user may select the reply command "Reply to All Recipients." In some embodiments of the invention, if the user wishes to send a related reply to all recipients of the selected message as well as those recipients of messages related to the selected message, the user may select "Reply to All in Thread." As described herein, the commands "Reply to Sender Only," "Reply to All Recipients," and "Reply to All in Thread" result in the creation of a relationship between the reply and the selected message that may be exploited by the threading service.

In some embodiments of the invention, however, the commands "New Message To" and "New Message To All" do not result in the creation of a relationship between the "reply" and the selected message that would be exploited by the threading service. In other words, these commands allow the user may to send an unrelated new message to one or more of the recipients of the selected message without creating the aforementioned relationships. For example, in some embodiments of the invention, if the user wishes to send an unrelated reply to only the sender of the selected message, the user may select the reply command "New Message To." In some embodiments of the invention, if the user wishes to send an unrelated reply to all recipients of the selected message, the user may select the reply command "New Message To All."

In some embodiments of the invention, the commands "New Message To" and "New Message To All" cause various address fields (e.g., a "To" address field) of the new message to be populated with values corresponding to address fields associated with the selected message. However, other fields that relate one message to another messages in a set of related messages such as, for example, a "Subject" field, an "In-Reply-To" field, a "References" field, a "$REF" field (used by, for example, Lotus Notes), a "Thread ID" field (used by, for example, Lotus Workplace Messaging), or other related message fields are not populated with values derived from the selected message. As a result, the user may use these commands as a short-cut for addressing a new message to one or more recipients of the selected message without created unwanted relationships.

Other objects and features of the invention will become apparent from the following detailed description considered in connection with the accompanying drawings. The drawings are designed for purposes of illustration only and the invention is not limited to the particulars shown therein. Various alternatives and modifications within the scope of the invention will be apparent from the description contained herein.

DETAILED DESCRIPTION OF PREFERRED EMBODIMENTS

The invention is now described in terms of messages in an email system. However, as will become apparent from the following description, the invention may be applicable to a variety of systems including, for example, file systems that manage documents, or other systems in which relationships between certain data is exploited.

Figure 1:
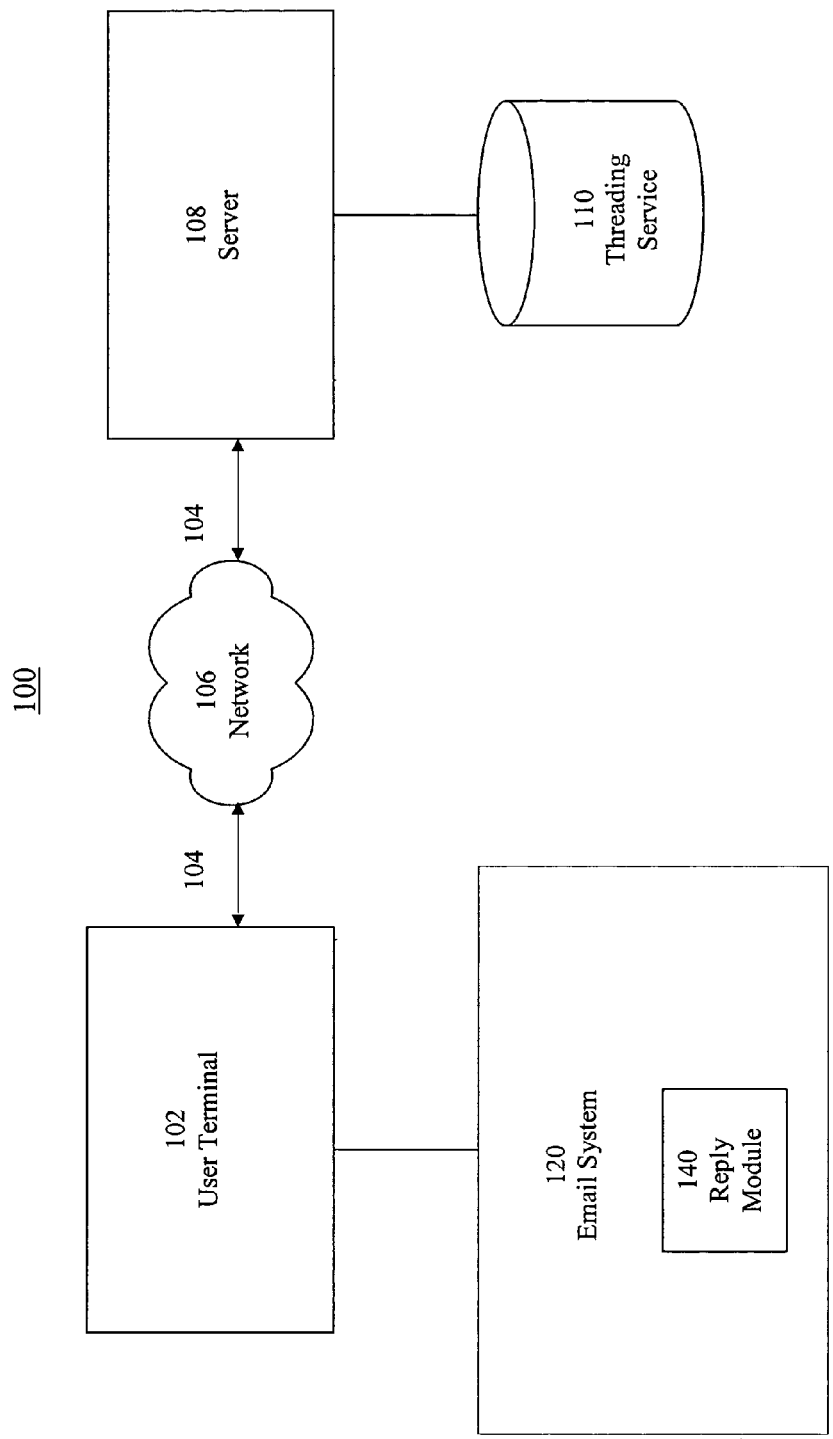
FIG. 1 illustrates a system that utilizes a threading service according to one embodiment of the invention.

FIG. 1 illustrates a system 100 includes an email system 120 operatively coupled to a threading service 110 according to various embodiments of the invention. In some embodiments of the invention, threading service 110 provides various features for email system 120 that draw upon relationships that exist between various messages in email system 120. In some embodiments of the invention, various features are implemented and/or controlled by a reply module 140.

As illustrated in FIG. 1, threading service 110 may operate on or in conjunction with a server 108. Although threading service 110 is described as being implemented on server 108, it shall be understood by those skilled in the art that threading service 110 may be located on user terminal 102 or any machine or machines associated with user terminal 102.

Server 108 may be or include, for example, a workstation running Microsoft Windows™ NT™, Microsoft Windows™ 2000, Microsoft Windows™ XP, Unix, Linux, Xenix, IBM, AIX™, Hewlett-Packard UX™, Novell Netware™, Sun Microsystems Solaris™, OS/2™, BeOS™, Mach, Apache, OpenStep™, or other operating system or platform.

As illustrated in FIG. 1, threading service 110 may be operatively coupled to server 108. Threading service 110 may include a database to store various types of data or information. Threading service 110 may include, or interface to, for example, the Oracle™ relational database sold commercially by Oracle Corporation, Informix™, DB2 (Database 2) or other data storage or query formats, platforms, or resources such as OLAP (On Line Analytical Processing), SQL (Standard Language Query), a SAN (storage area network), Microsoft Access™ or any other type of database.

In some embodiments of the invention, a threading service 110 may be used to identify, track, and/or exploit relationships among messages and/or documents. Various threading services may be used such as those described in U.S. patent application Ser. No. 10/334,087 (Publication No. US20030163537A1), entitled "Method and Apparatus for Handling Conversation Threads and Message Groupings as a Single Entity," filed Dec. 30, 2002, and U.S. patent application Ser. No. 09/995,151 (Publication No. US20030101065A1), entitled "Method and Apparatus for Maintaining Conversation Threads in Electronic Mail," filed Nov. 27, 2001, the specifications of which are herein incorporated by reference in their entirety. It should be noted that the invention is not limited to any particular mechanism for determining threads among a set of documents including email messages.

User terminal 102 is operatively coupled to a network 106 via a communications link 104. User terminal 102 may include any one or more of, for example, a desktop computer, a laptop or other portable computer, a hand-held computer device such as a Blackberry, a Personal Digital Assistant (PDA), a web-enabled mobile phone, or a Palm Pilot, or any other computer device.

Network 106 may include any one or more networks. For example, network 106 may include the Internet, an intranet, a PAN (Personal Area Network), a LAN (Local Area Network), a WAN (Wide Area Network), a SAN (Storage Area Network), a MAN (Metropolitan Area Network), or other network.

Communications link 104 may include any one or more communications links. For example, communications link 104 may include a copper telephone line, a Digital Subscriber Line (DSL) connection, a Digital Data Service (DDS) connection, an Ethernet connection, an Integrated Services Digital Network (ISDN) line, an analog modem connection, a cable modem connection, a wireless connection, or other communications link.

Figure 2:
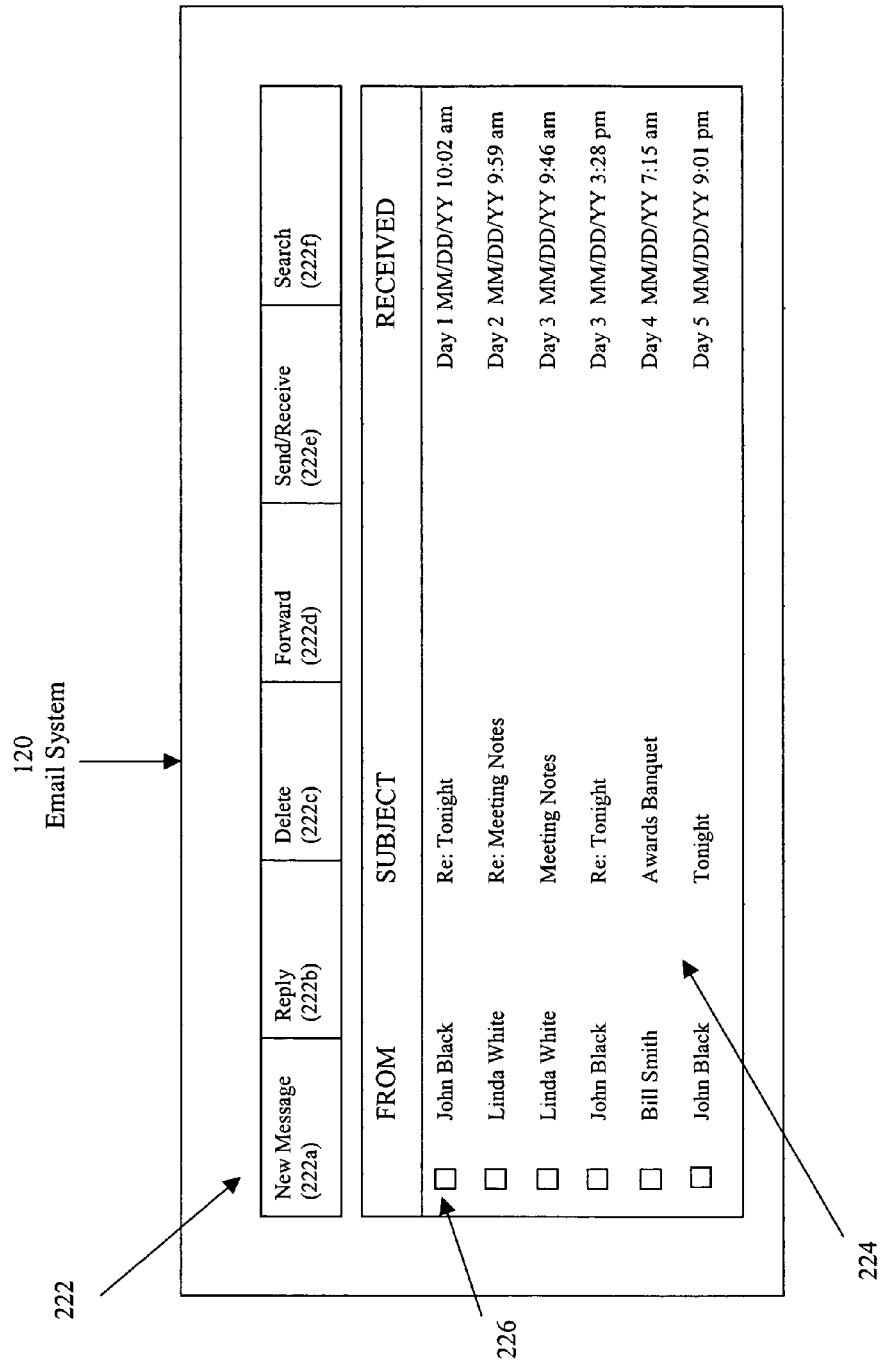
FIG. 2 illustrates a user interface used by an email system according to one embodiment of the invention.

FIG. 2 illustrates a user interface 200 that may be used with email system 120. User interface 200 120 may include a menu 222 useful for managing various aspects of email system 120. In some embodiments of the invention, menu 222 may include various email features, such as "New Message" 222*a*, "Reply" 222*b*, "Delete" 222*c*, "Forward" 222*d*, "Send/Receive" 222*e*, "Search" 222*f*, and other email features as would be apparent.

Email system 120 may also include a message set 224 which may include, for example, an inbox for a user having various new and saved email messages. Each message of message set 224 may include a selection box 226. Selection box 226 allows a user to select one or more messages and therefore perform various actions on that message, such as reply, forward, delete, or other action. Although the messages are described as being selected via selection box 226 in the invention, it is understood by those skilled in the art that messages may be selected using various other selecting mechanisms, such as highlighting the selected message or any other selecting mechanism as would be apparent.

Figure 3:
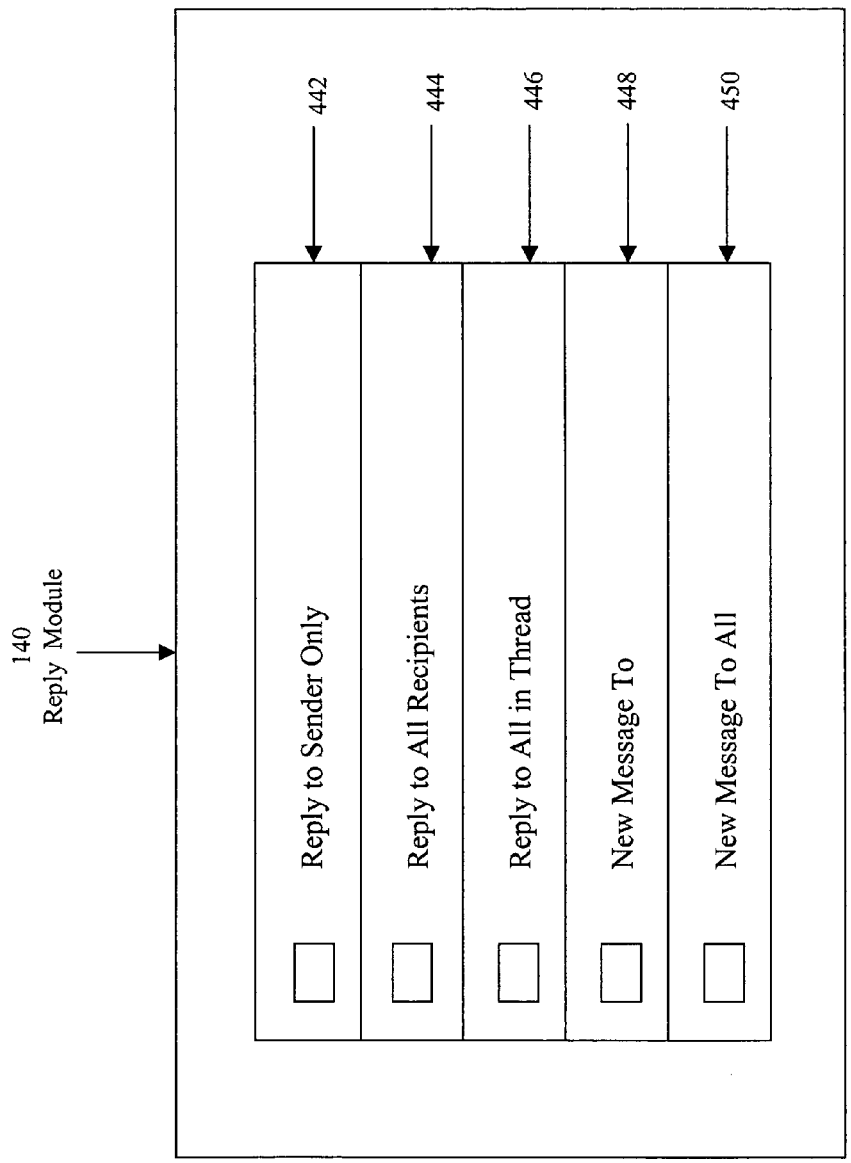
FIG. 3 illustrates a reply module of an email system according to one embodiment of the present invention.

FIG. 3 illustrates a reply module 140 according to various embodiments of the invention. As illustrated, reply module 140 controls or otherwise implements reply commands that provide the user with various reply options for replying to a selected message. In some embodiments of the invention, these reply options may include one or more of the following: a "Reply to Sender Only" command 442, a "Reply to All Recipients" command 444, a "Reply to All in Thread" command 446, a "New Message To" command 448, and/or a "New Message To All" command 450. The commands "Reply to Sender Only" 442, "Reply to All Recipients" 444, and "Reply to All in Thread" 446 result in a reply message being related to the selected message in a manner by which threading service 110 may exploit any relationships among the reply and the selected message. In contrast, the commands "New Message To" 448 and "New Message To All" 450 do not create unintended relationships between the message and the selected message. Depending on which reply option is selected, reply module 140 may access threading service 110.

To utilize reply module 140 of the invention, a user selects one or more messages from messages set 224 presented in user interface 200. As discussed above, the user may accomplish this using selection box 226 or some other selecting mechanism. In some embodiments of the invention, the user may wish to reply to the selected message in a manner in which a relationship between the reply and the selected message is maintained. In these embodiments of the invention, the user may wish to reply: only to the sender of the selected message, to all the recipients of the selected message, and/or to all the recipients of the selected message or any message related to the selected message.

In some embodiments of the invention, the user may wish to use addresses of one or more recipients of the selected message to create a new message without maintaining a relationship between the new message and the selected message. In these embodiments of the invention, the user may wish to send a new message to all the recipients of the selected message without creating a relationship between the new message and the selected message. In some embodiments of the invention, the user may wish to send a new message to all the recipients of the selected message as well as to any recipients of messages related to the selected message without creating a relationship between the new message and the selected message.

After selecting a message, the user may select "Reply" 222*b* from toolbar 222 of user interface 200. Selecting "Reply" 222*b* accesses or otherwise invokes reply module 140. Subsequently, reply module 140 may display various reply commands that provide the user with various reply options. These reply options may include "Reply to Sender Only" 442, "Reply to All Recipients" 444, "Reply to All in Thread" 446, "New Message To" 448, and/or "New Message to All" 450.

The user may then select one of these reply options in accordance with the action the user wishes to take with regard to the selected message. In some embodiments of the invention, if the user wishes to send a reply only to the sender of the selected message, the user may select "Reply to Sender Only" command 442. In some embodiments of the invention, if the user wishes to send a reply to all recipients of the selected message, the user may select "Reply to All Recipients" command 444. In some embodiments of the invention, if the user wishes to send a reply to all the recipients of the selected message or any message related to the selected message, the user may select "Reply to All in Thread" command 446. In some embodiments of the invention, if the user wishes to send an unrelated reply or new message to all the recipients of the selected message without creating a relationship between the new message and the selected message, the user may select "New Message To" command 448. In some embodiments of the invention, if the user wishes to send an unrelated reply or new message to all the recipients of the selected message as well as to any recipients of messages related to the selected message without creating a relationship between the new message and the selected message, the user may select "New Message To All" command 450.

After the user has selected a reply command, reply module 140 causes the appropriate reply message to be generated. If the selected reply command was "Reply to Sender Only" 442, reply module 140 inserts an address of the sender of the selected message into a reply message. In some embodiments of the invention, reply module 140 retrieves an email address from the "From" field of the selected message and inserts it into the "To" field of the reply message as would be apparent. This command also populates one or more fields of the reply message that identify the reply message as being related to the selected message as would be apparent.

If the selected reply command is "Reply to All Recipients" 444, reply module 140 inserts an address of the sender and all recipients of the selected message into a reply message. In some embodiments of the invention, reply module 140 retrieves email addresses from the "From," "To," "CC," and/or "BCC" fields of the selected message and inserts them into a corresponding field in the reply message as would be apparent. This command also populates one or more fields of the reply message that identify the reply message as being related to the selected message as would be apparent.

If the selected reply command is "Reply to All in Thread" 446, reply module 140 inserts an address of the sender, all recipients of the selected message, and all recipients of messages related to the selected message into a reply message. In some embodiments of the invention, reply module retrieves email addresses from a list of messages related to the selected message. In some embodiments of the invention, this may be accomplished using header information associated with each of the messages in the list of related messages to collect unique names or addresses from the address fields therein. These names or addresses may then be inserted into corresponding fields in the reply message. This command also populates one or more fields of the reply message that identify the reply message as being related to the selected message as would be apparent.

In some embodiments of the invention, in order to "Reply to All in Thread," reply module 140 may request a list of messages related to the selected message from threading service 110. The list of related messages includes the selected message and all messages in the same "thread," or those messages determined by threading service 110 to be related to the selected message. The list of related messages may be stored in a memory buffer (not otherwise illustrated) of email system 120. Reply module 140 may access the memory buffer and retrieve the list of related messages.

In some embodiments of the invention, reply module 140 may gather header information for each message in the list of related messages. The header information gathered by reply module 140 may include a variety of fields that are used for addressing, including, but not limited to: "From," "To," "CC," "BCC," "Sent on behalf of," "Reply to," or any other address field as would be apparent.

If the selected reply command is "New Message To" 448, reply module 140 inserts an address of the sender into a new message or reply message. In some embodiments of the invention, reply module 140 retrieves an email address from the "From" field of the selected message and inserts it into the "To" field of the reply message as would be apparent. However, the command "New Message To" 448 results in the reply message being unrelated to the selected message. Specifically, in some embodiments of the invention, any fields of the reply message that might identify or associate it with the selected message are not automatically populated.

In some embodiments of the invention, if the selected reply command is "New Message To" 448, reply module 140 retrieves the "From" address field from the selected message and stores that address in a memory buffer (not otherwise illustrated). Reply module 140 then creates a new blank email message. The new blank email message does not include any text from the selected message or any other information that might associate it as related to the selected message. Reply module 140 then inserts the address stored in the memory buffer into the "To" address field of the new message. As a result, the "To" field of the new message includes the address of the sender of the selected message. Other fields that relate a message to other messages in a set of related messages, such as, for example, a "Subject" field, a "In-Reply-To" field, a "$REF" field (e.g., as used in Lotus Notes), a "Thread ID" field (e.g., as used in Lotus Workplace Messaging) are not populated with values derived from the selected message as they would with conventional reply messages.

If the selected reply command is "New Message To All" 450, reply module 140 inserts an address of the sender of the selected message as wells as all recipients of the selected message into a new message or reply message. In some embodiments of the invention, reply module 140 retrieves all email addresses from the "From," "To," "CC," and "BCC" fields of the selected message into one or more field of the reply message as would be apparent. In some embodiments of the invention, reply module 140 retrieves all email addresses from the "From," "To," "CC," and "BCC" fields of the selected message into corresponding fields of the reply message. However, the command "New Message To All" 450 results in the new message or reply message being unrelated to the selected message. Specifically, in some embodiments of the invention, any fields of the reply message that might identify or associate it with the selected message are not automatically populated.

Reply module 140 then inserts the address stored in the memory buffer into the "To" address field of the new message. As a result, the "To" field of the new message includes the address of the sender of the selected message. Other fields that relate a message to other messages in a set of related messages, such as, for example, a "Subject" field, a "In-Reply-To" field, a "$REF" field (e.g., as used in Lotus Notes), a "Thread ID" field (e.g., as used in Lotus Workplace Messaging) are not populated with values derived from the selected message as they would with conventional reply messages.

In some embodiments of the invention, after the address fields are populated, reply module 140 (or other control module) may cause a cursor to be placed in a blank "subject" field of the new message thereby minimizing the users effort with the new message.

In some embodiments of the invention, if selected reply command is "New Message To All" 450, reply module 140 retrieves the "From," "To," "CC," and/or "BCC" address fields from the selected message and stores those addresses in a memory buffer (not shown). Reply module 140 then creates a new blank email message. The new blank email message does not include any text from the selected message or any other information that might associate it as related to the selected message. In some embodiments of the invention, reply module 140 then inserts the addresses stored in the memory buffer into the "To" address field of the new message. In some embodiments of the invention, reply module 140 inserts the addresses stored in the memory buffer into the corresponding address fields of the new message. As a result, one or more address fields of the new message are populated with addresses of recipients of the selected message. Other fields that relate a message to other messages in a set of related messages, such as, for example, a "Subject" field, a "In-Reply-To" field, a "$REF" field (e.g., as used in Lotus Notes), a "Thread ID" field (e.g., as used in Lotus Workplace Messaging) are not populated with values derived from the selected message as they would with conventional reply messages.

While particular embodiments of the present invention have been described, it is to be understood that modifications will be apparent to those skilled in the art without departing from the spirit of the invention. The scope of the invention is not limited to the specific embodiments descried herein. Other embodiments, uses and advantages of the invention will be apparent to those skilled in art from consideration of the specification and practice of the invention disclosed herein. The specification should be considered exemplary only, and the scope of the invention is accordingly intended to be limited by the following claims.

What is claimed is:

1. A method for automatically creating a new email message in an email system comprising a threading service for establishing relationships between related email messages, the email system executing on a computer device, and wherein the new email message does not include any information that, to the threading service, would be indicative of a relationship between the new email message and a selected email message, the method comprising:
presenting, via a user interface of the computer device, a reply module comprising a plurality of reply options to reply to the selected email message and a plurality of reply options to generate a new email message;
wherein the plurality reply options to reply to the selected message are selected from a group consisting of a reply message to sender only, are reply to all recipients and a reply to all in thread;
wherein the plurality of reply options to generate the new email message are selected from a group consisting of a new message to and a new message to all;
receiving a reply option selection to create the new email message using one or more addresses from the selected email message;
automatically storing, by the email system executing on the computer device, in a memory buffer the one or more email addresses from the selected email message;
automatically generating, by the email system executing on the computer device, the new email message, the new email message including at least one address field and a plurality of other fields, the plurality of other fields including a body field and at least one other field, wherein the new email message is unrelated to the selected email message and is generated with a new thread identifier; and
automatically retrieving, by the email system executing on the computer device, from the memory buffer the one or more email addresses stored in the memory buffer and automatically populating the at least one address field of the new email message with the one or more email addresses stored in the memory buffer, wherein the email system refrains from populating any of the plurality of other fields of the new email message, including the at least one other field, with any information that, to the threading service, would be indicative of a relationship between the new email message and the selected email message.

2. The method of claim 1, wherein, in response to receiving a new message to sender reply option selection, the at least one address field of the new email message is populated with the entail address of the sender of the selected email message.

3. The method of claim 1, wherein:
receiving the reply option selection to create the new email message using one or more addresses from the selected email message comprises receiving a new message to all reply option;
automatically storing, by the email system executing on the computer device, in the memory buffer the one or more email addresses from the selected email message comprises automatically storing in the memory buffer a plurality of email addresses from the selected email message;
automatically retrieving, by the email system executing on the computer device, from the memory buffer the one or more email addresses stored in the memory buffer comprises automatically retrieving from the memory buffer the plurality of email addresses from the selected email message; and
automatically populating the at least one address field of the new email message with the one or more email addresses stored in the memory buffer comprises automatically populating the at least one address field of the new email message with the plurality of email addresses from the selected email message.

4. A method for automatically creating a new email message in an email system comprising a threading service for establishing relationships between related email messages, the email system executing on a computer device, the method comprising:
presenting, via a user interface of the computer device, a reply module comprising a plurality of reply options to reply to the selected email message and a plurality of reply options to generate a new email message;
wherein the plurality reply options to reply to the selected message are selected from a group consisting of a reply message to sender only, a reply to all recipients and a reply to all in thread;
wherein the plurality of reply options to generate the new email message are selected from a group consisting of a new message to and a new message to all; and in response to receiving a new message to sender option selection from the plurality of reply options:

automatically storing, by the email system executing on the computer device, in a memory buffer an email address of the sender from the selected email message;

automatically generating, by the email system executing on the computer device, a first new email message unrelated to the selected email message and is generated with a new thread identifier; and that does not include any information that, to the threading service, would be indicative of a relationship between the first new email message and the selected email message, the first new email message including at least one address field and a plurality of other fields, the plurality of other fields including a body field and at least one other field; and automatically retrieving, by the email system executing on the computer device, from the memory buffer the email address of the sender of the selected message stored in the memory buffer and automatically populating the at least one address field of the first new email message with the email address of the sender of the selected email message, wherein the email system refrains from populating any of the plurality of other fields of the first new email message, including the at least one other field, with any information that, to the threading service, would be indicative of a relationship between the first new email message and the selected email message.

5. The method of claim 4, further comprising:
in response to receiving a reply to sender option selection, automatically populating an address field of a second new email message with an address of the sender of the selected message, wherein the selected email message and the second new email message become related to one another.

6. The method of claim 4, further comprising:
in response to receiving a reply to all recipients option selection, automatically addressing a third new email message to the sender of the selected email message and all recipients of the selected email message, wherein the selected email message and the third new email message become related to one another.

7. The method of claim 4, wherein the plurality of reply options includes a reply to all in thread option, the method further comprising:
in response to receiving a reply to all in thread option selection, automatically addressing a fourth new email message to the sender of the selected email message, all recipients of the selected email message, and all recipients of email messages related to the selected email address, wherein the selected email message and the fourth new email message become related to one another.

8. The method of claim 4, wherein the plurality of reply options includes a new message to all recipients option, the method further comprising:
in response to receiving a new message to all recipients option selection, automatically addressing a fifth new email message to the sender of the selected email message and all recipients of the selected email message, wherein the selected email message and the fifth new email message remain unrelated to one another with regard to the email system.

9. An email system operatively coupled to a threading service for establishing a relationship between related email messages, the email system comprising a reply module for automatically creating a new email message, the email system and reply module executing on a computer device, wherein the new email message does not include any information that, to the threading service, would be indicative of a relationship between the new email message and a selected email message, and wherein the reply module is configured to:

presenting, via a user interface of the computer device, a reply module comprising a plurality of reply options to reply to the selected email message and a plurality of reply options to generate a new email message;

wherein the plurality reply options to reply to the selected message are selected from a group consisting of a reply message to sender only, a reply to all recipients and a reply to all in thread;

wherein the plurality of reply options to generate the new email message are selected from a group consisting of a new message to and a new message to all;

receiving a reply option selection to create the new email message using one or more addresses from the selected email message;

automatically store in a memory buffer the one or more email addresses from the selected email message;

automatically generate a new email message, the new email message including at least one address field and a plurality of other fields, the plurality of other fields including a body field and at least one other field, wherein the new email message is unrelated to the selected email message and is generated with a new thread identifier; and automatically retrieve from the memory buffer the one or more email addresses stored in the memory buffer and automatically populate the at least one address field of the new email message with the one or more email addresses stored in the memory buffer, wherein the reply module refrains from populating any of the plurality of other fields of the first new email message, including the at least one other field, with any information that, to the thread service, would be indicative of a relationship between the first new email message and the selected email message.

10. The system of claim 9, wherein the at least one address field of the new email message is populated with the email address of the sender of the selected email message in response to receiving a new message to sender reply option selection.

11. The system of claim 9, wherein:
the reply option selection is a selection of a new message to all reply option;
the one or more email addresses from the selected email message stored in the memory buffer comprises a plurality of email addresses from the selected email message;
the one or more email addresses retrieved from the memory buffer comprises the plurality of email addresses from the selected email message; and
the at least one address field of the new email message that is automatically populated with the one or more email addresses stored in the memory buffer is populated with the plurality of email addresses from the selected email message.

* * * * *